United States Patent
Gehrke

(10) Patent No.: US 9,802,539 B2
(45) Date of Patent: Oct. 31, 2017

(54) DISTANCE AND DIRECTION ESTIMATION OF A TARGET POINT FROM A VEHICLE USING MONOCULAR VIDEO CAMERA

(71) Applicant: Robert Bosch GmbH, Stuttgart (DE)

(72) Inventor: Mark Gehrke, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 14/675,862

(22) Filed: Apr. 1, 2015

(65) Prior Publication Data
US 2016/0288711 A1 Oct. 6, 2016

(51) Int. Cl.
| B60R 1/00 | (2006.01) |
| G06T 3/00 | (2006.01) |
| G06K 9/00 | (2006.01) |
| G06T 7/00 | (2017.01) |
| G06T 7/73 | (2017.01) |

(52) U.S. Cl.
CPC ............ *B60R 1/00* (2013.01); *G06K 9/00805* (2013.01); *G06T 3/00* (2013.01); *G06T 7/73* (2017.01); *B60R 2300/402* (2013.01); *B60R 2300/8093* (2013.01); *G06T 2207/30261* (2013.01)

(58) Field of Classification Search
CPC ............... B60R 1/00; B60R 2300/402; B60R 2300/8093; G06K 9/00805; G06T 2207/30261; G06T 3/0018; G06T 7/0042
USPC .......................................................... 348/36
See application file for complete search history.

(56) References Cited

U.S. PATENT DOCUMENTS

| 8,164,628 | B2 | 4/2012 | Stein et al. |
| 8,559,674 | B2 | 10/2013 | Uchida et al. |
| 9,459,113 | B2 * | 10/2016 | Zhang .................. G01C 21/36 |
| 2003/0030546 | A1 | 2/2003 | Tseng |
| 2006/0022978 | A1 * | 2/2006 | Hoff .................... G06T 17/05 |
| | | | 345/427 |
| 2007/0100543 | A1 * | 5/2007 | Kato ................... B62D 15/027 |
| | | | 701/36 |

(Continued)

FOREIGN PATENT DOCUMENTS

| CN | 103077524 A | 5/2013 |
| CN | 103745452 A | 4/2014 |

(Continued)

*Primary Examiner* — Francis G Geroleo
(74) *Attorney, Agent, or Firm* — Michael Best & Friedrich LLP

(57) ABSTRACT

A method and system for determining a distance and direction between a video camera secured on a vehicle and a target point relies on an electronic control unit. The system maps and stores grid points representing a world coordinate grid onto a screen coordinate grid and displays the video image on a display using the screen coordinate grid. The system obtains a target point of an object in the video image and determines a locus of four closest grid points of the screen coordinate grid that encircle the target point. The system determines screen distances from the target point to each of the four grid points and maps the four grid points onto the world coordinate grid. The electronic control unit interpolates the location of the target point in the world coordinate grid as weighted by the screen distances. Using the video camera location in world coordinates and the target point location in world coordinates, the system determines a distance between the video camera and the target point.

21 Claims, 6 Drawing Sheets

(56) References Cited

U.S. PATENT DOCUMENTS

| | | | | |
|---|---|---|---|---|
| 2008/0031514 A1* | 2/2008 | Kakinami | ................. | G06T 7/80 |
| | | | | 382/154 |
| 2009/0125234 A1* | 5/2009 | Geelen | ............... | G01C 21/3647 |
| | | | | 701/533 |
| 2012/0002871 A1 | 1/2012 | Hu et al. | | |

FOREIGN PATENT DOCUMENTS

| | | |
|---|---|---|
| CN | 103761737 A | 4/2014 |
| EP | 1806595 B1 | 7/2007 |

* cited by examiner

DISTANCE AND DIRECTION ESTIMATION OF A TARGET POINT FROM A VEHICLE USING MONOCULAR VIDEO CAMERA

BACKGROUND

The present invention relates to a method and apparatus for estimating distance of an object from a vehicle with a monocular video camera.

Video cameras are increasingly used in vehicle applications due to their low cost and moderate processing requirements. While providing excellent angular resolution, monocular video cameras provide almost no distance resolution. Thus, for applications where the target point of an object from a vehicle is desired, determining distance is a challenge.

SUMMARY

In one embodiment, the invention provides a method of determining a distance and direction between a video camera provided on a vehicle and a target point as a point of interest of an object in a field of view of the video camera, comprising: pre-initializing by mapping and storing in an electronic control unit a grid of points representing a world coordinate grid mapped onto a screen coordinate grid; generating a video image with the video camera and providing the video image to an electronic control unit including a processor and a memory; displaying the video image on a display using the screen coordinate grid; obtaining the target point as the point of interest for an object in the video image; determining a locus of four grid points of the screen coordinate grid that encircle the target point; determining and storing screen distances from the target point to each of the four grid points encircling the target point; mapping the four grid points from the screen coordinate grid encircling the target point onto the world coordinate grid; applying interpolation to determine a location of the target point in the world coordinate grid as weighted by the screen distances; and using a known location of the video camera in world coordinates and the determined location of the target point in world coordinates, determining a distance between the location of the video camera and the target point of the object.

In one embodiment, applying interpolation to determine the location of the target point comprises applying bi-linear interpolation by: weighting each of the four grid points in the world coordinates that encircle the target point by a square of an inverse of the screen distance determined for each of the four grid points in the screen coordinate grid and normalizing by a sum of the inverse squared screen distances to determine the location of the target point in world coordinates.

In one embodiment, the video camera comprises a monocular panoramic video camera. In another embodiment, the extrinsic video camera calibration parameters include lens properties of a lens of the video camera.

In another embodiment, pre-initializing by mapping and storing the grid of points representing the world coordinate grid onto the screen coordinate grid, comprises: providing extrinsic video camera calibration parameters to the electronic control unit; providing the world coordinate grid of world coordinates with known physical dimensions; transforming the world coordinate grid to the screen coordinate grid in view of the calibration parameters; and providing the screen coordinate grid of the screen coordinates.

One embodiment includes determining changes in distance from the video camera provided on the vehicle to the target point of the object to avoid a collision.

In one embodiment the display comprises a touch screen and obtaining the target point as the point of interest for the object shown in the video image comprises touching the touch screen at the target point of the object in the video image displayed thereon.

In another embodiment, obtaining of the target point as the point of interest for the object shown in the video image further comprises: enlarging and centering the object shown in the video image at the touched target point on the touch screen; selecting an exact target point of the object in the enlarged video image by touching the touch screen at the target point a second time; and defining the exact target point in response to the second touching of the touch screen.

In another embodiment, the invention provides a system for determining a distance and direction between a video camera provided on a vehicle and a target point as a point of interest of an object in a field of view of the video camera, comprising a video camera secured to a vehicle for generating video images, and an electronic control unit including a processor and a memory. The electronic control unit is configured to: pre-initialize by mapping and storing in memory a grid of points representing a world coordinate grid mapped onto a screen coordinate grid; receive video images from the video camera; display the video image on a display using the screen coordinate grid; obtain the target point as the point of interest for the object shown in the video image on the display; determine a locus of four grid points of the screen coordinate grid that encircle the target point; determine and store screen distances from the target point to each of the four grid points; map the four grid points encircling the target point from the screen coordinate grid onto the world coordinate grid; apply interpolation to determine a location of the target point in the world coordinate grid as weighted by the screen distances; and, using a known location of the video camera in world coordinates and the location of the target point in world coordinates, determine a distance and direction from the location of the video camera to the target point of the object.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
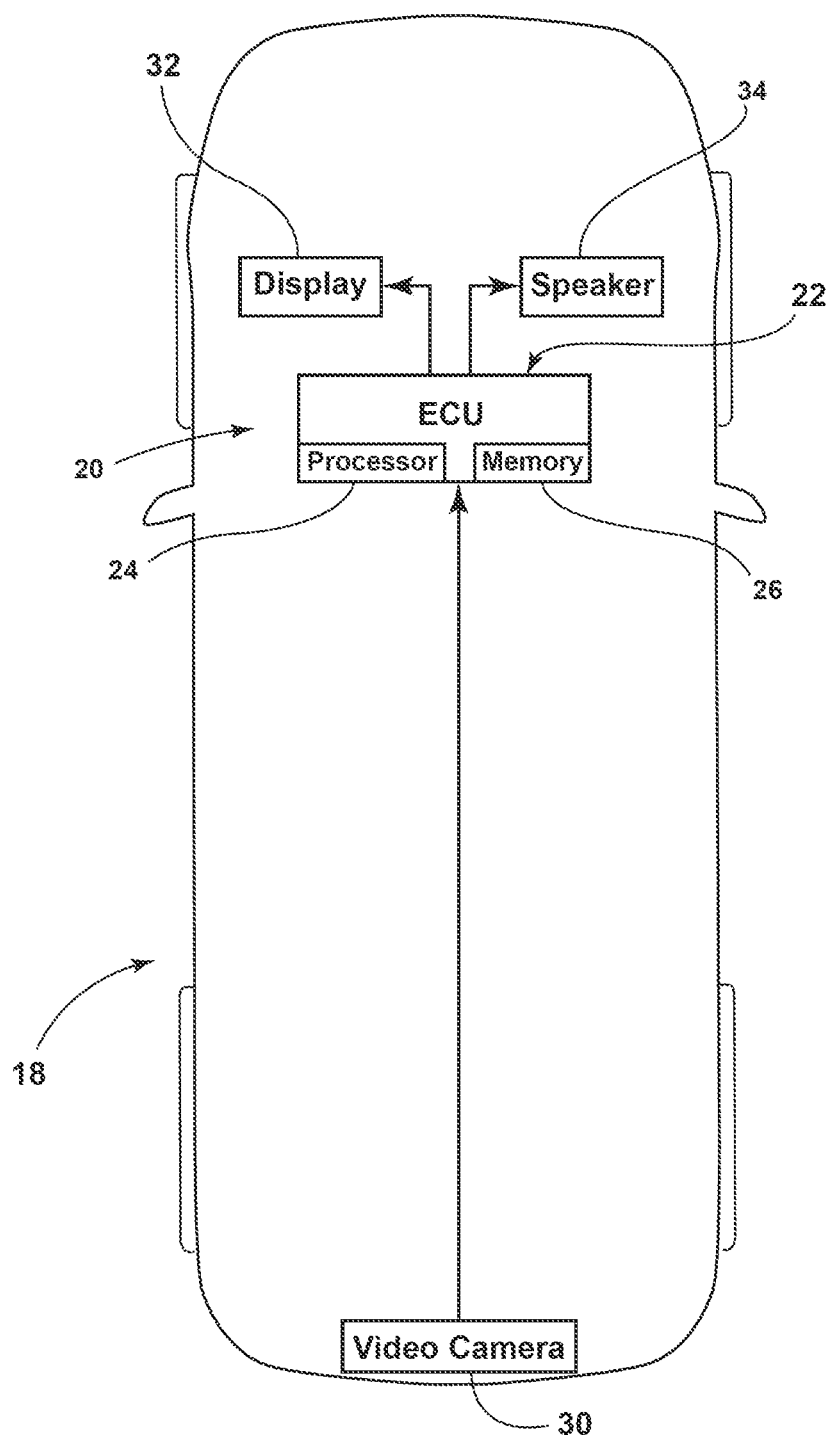
FIG. 1 is a vehicle provided with a monocular video camera.

FIG. 1 shows a vehicle 18 with a system 20 for estimating distance of an object from the vehicle. The system 20 includes an electronic control unit (ECU) 22 with a processor 24 and at least one of a volatile memory and a non-volatile memory 26. In FIG. 1, the system 20 includes a monocular video camera 30 secured at the rear of the vehicle 18. The video camera 30 is provided to obtain a target point as a point of interest of an object in a field of view of the video camera. In some embodiments, the video camera 30 is a monocular panoramic video camera.

The ECU 22 receives an input from the video camera 30 and is configured to provide an output to a display 32 in communication therewith. In some embodiments, the display 32 is a touch screen display for receiving inputs. Other interfaces for receiving inputs are also contemplated. The ECU 22 communicates with a speaker 34 in the vehicle to provide audio warnings to a vehicle operator. The determined distance between the video camera 30 and an object is utilized for one or more of parking assistance, collision avoidance and other purposes.

Calibration

Figure 2:
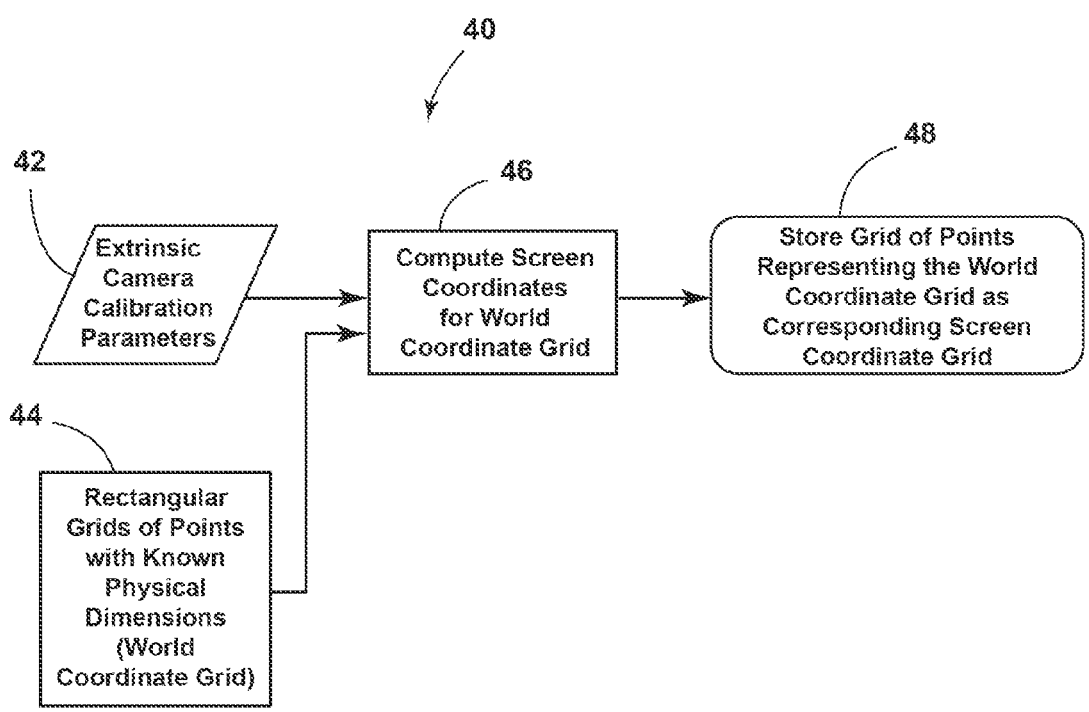
FIG. 2 is a flow chart showing pre-initializing steps for the system.

Before operating the system 20, calibration of the video camera 30 with the ECU 22 and the display 32 is performed by pre-initializing the system 20. The flow chart 40 of FIG. 2 shows that pre-initializing begins by the ECU 22 at step 42 with the processor 24 obtaining extrinsic video camera calibration parameters. The parameters include the field-of-view, lens properties, video camera model and other video camera features for the video camera 30. In one embodiment, the parameters are obtained by calibration signals from the video camera 30. In another embodiment, the parameters are obtained from a menu displayed on the display 32 and inputs or selections by an operator. Other arrangements, such as a flash drive corresponding to a particular video camera 30 are contemplated.

Figure 3:
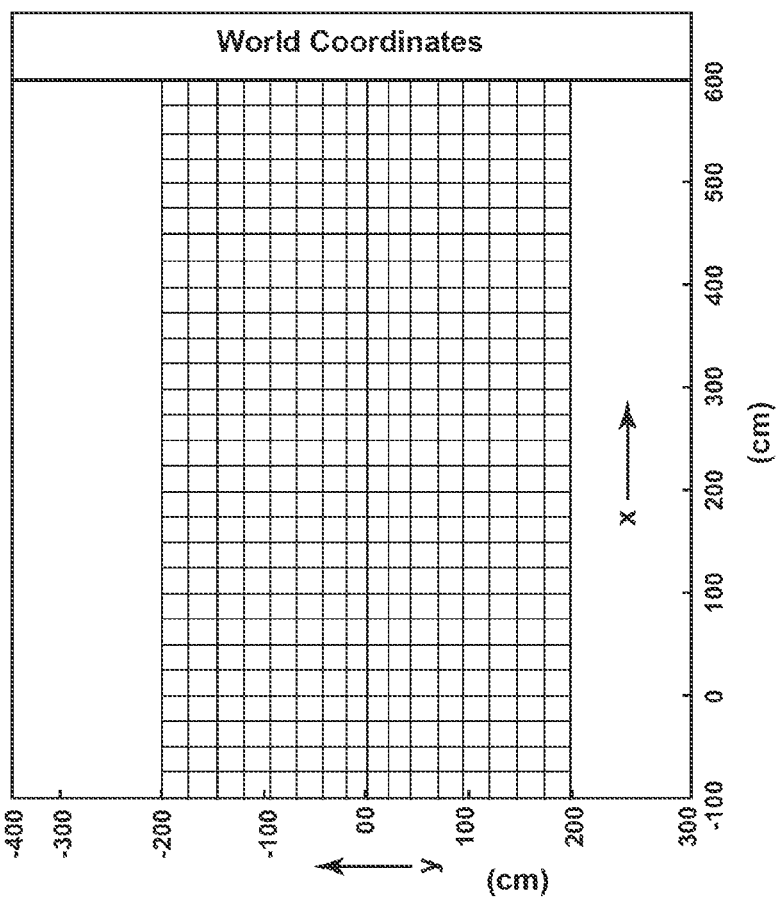
FIG. 3 is a graph of world coordinates.

At step 44 shown in FIG. 3, the electronic control unit 22 also receives and stores or contains in memory 26 a rectangular grid of points with known physical dimensions that are world coordinates. FIG. 3 shows one embodiment for a world coordinate grid of world coordinates having a distance y at or along the vehicle and a distance x away from the vehicle. While a grid of points is discussed, the grid points are disposed at the intersections of the lines forming the grid.

Figure 4:
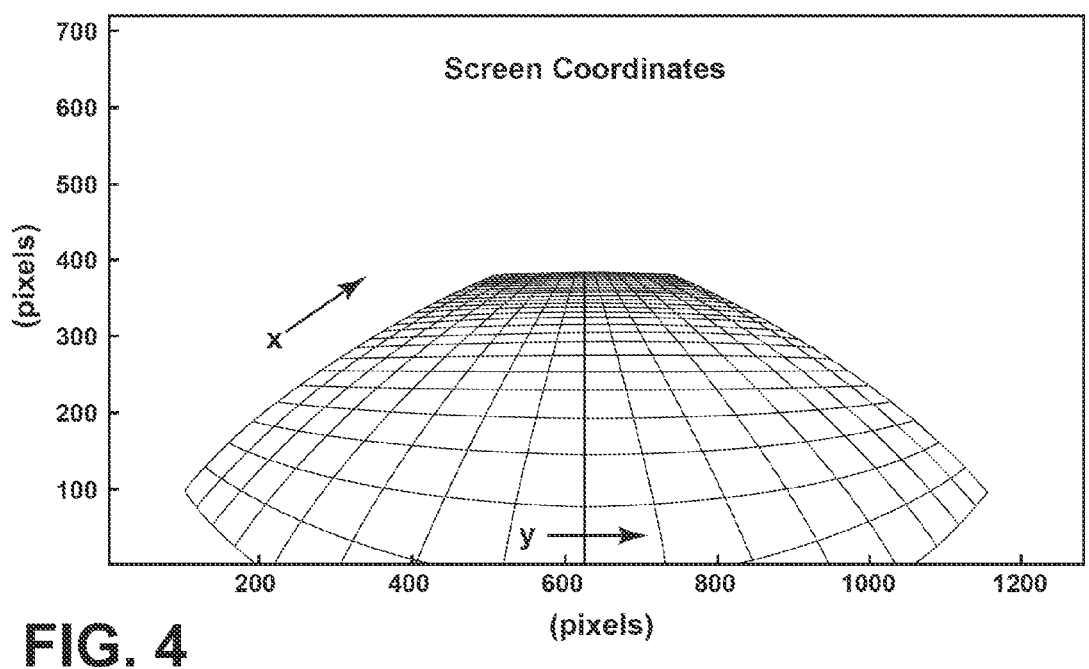
FIG. 4 is a graph of screen coordinates.

At step 46 shown in FIG. 2, the processor 24 transforms a grid of points having the world coordinates in view of the video camera calibration parameters by calculating or determining a corresponding map of screen coordinates with the same grid lines. FIG. 4 shows a view of screen coordinates that differ greatly from the world coordinates shown in FIG. 3. One factor is the wide angle panoramic lens that causes distortions in the video images. For instance, when the video camera parameters include data for a panoramic lens, the changes to the image caused by the shape must be accounted to by changing the screen coordinates. At step 48, the processor 24 stores the grid of points representing the world coordinate grid as mapped onto a corresponding screen coordinate grid. After step 48, the pre-initializing routine ends. Thus, a grid of points representing a world coordinate grid are mapped onto a screen coordinate grid by the processor 24 and stored in memory 26. The pre-initializing steps for the system 20 typically occur before shipping of a vehicle or upon a first initial start-up of the system 20.

Operation

Figure 5:
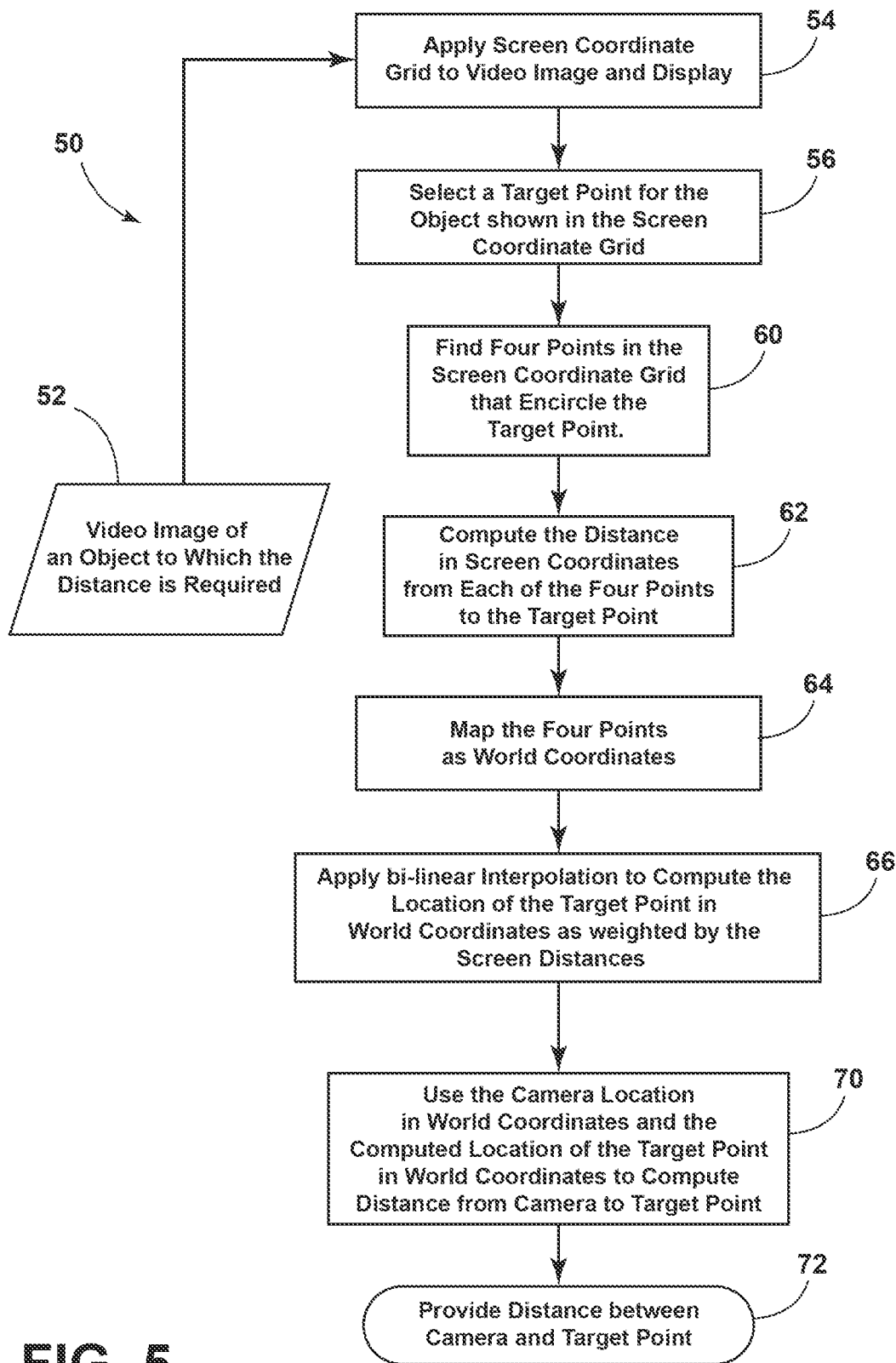
FIG. 5 is a flow chart showing operation of the system.

The flow chart 50 shown in FIG. 5 illustrates operation of the system 20. The system 20 is either actuated by an operator or is automatically started with the video camera 30. Other ways to start the system 20 are also contemplated.

At step 52 in FIG. 5, video images generated by the video camera 30 are communicated to the ECU 22. At step 54, the video image is displayed on the display 32 using a screen coordinate grid. Displaying an object on a display is set forth in commonly owned U.S. patent application Ser. No. 14/675,872 filed Apr. 1, 2015, the disclosure of which is hereby incorporated by reference. Then the processor 24 advances to step 56.

Figure 6:
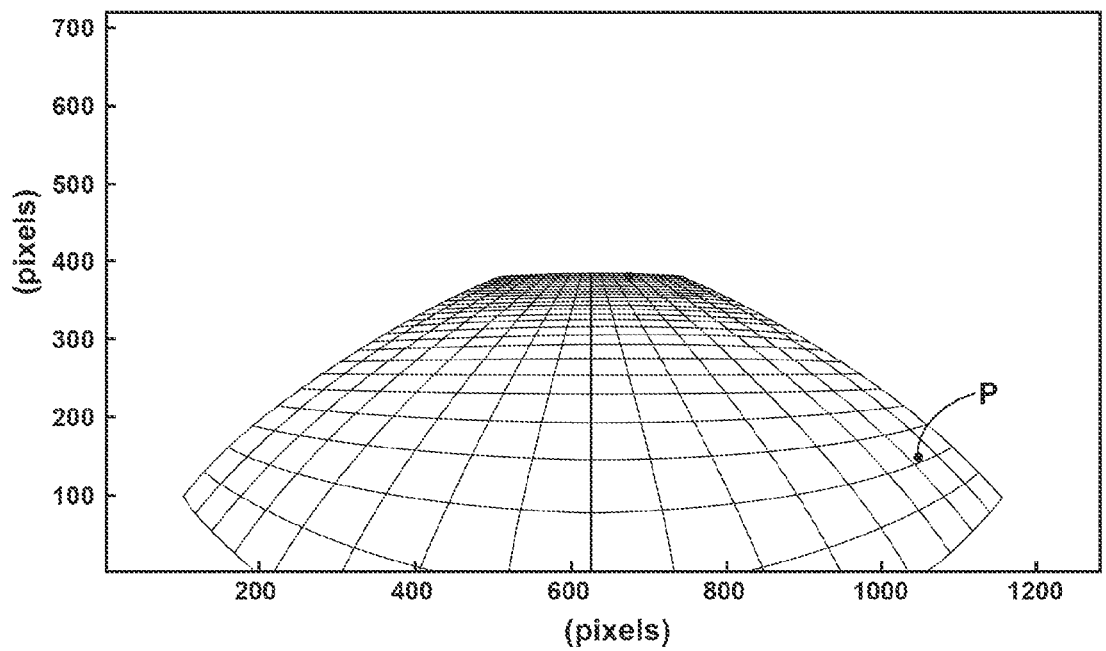
FIG. 6 is a graph of screen coordinates with a target as a point of interest.

At step 56, an operator viewing the video image selects a target point on the viewing screen corresponding to the object of interest for tracking purposes. In one embodiment, the display 32 is a touch screen and the video image is displayed thereon. The operator selects the target point for the object of interest by touching the touch screen. Thus, the point touched defines the obtained target point. FIG. 6 shows the target point p that corresponds to an object of interest viewable on the display 32 that is selected by the operator on the touch screen. Target point p is a target point for the object of interest, and does not include within its bounds the entire object. Thus, FIG. 6 is provided for illustration of the operation of the invention and does not illustrate the object corresponding to the target point or the video image on the touch screen.

In another embodiment, step 56 is a two-step process. In a first step, a first touch of the touch screen enlarges and centers an area about the touched screen location. A second touch of the enlarged video image on the touch screen locates and defines the exact target point p. The two step approach provides more accuracy in selecting the obtained exact target point p.

Figure 7:
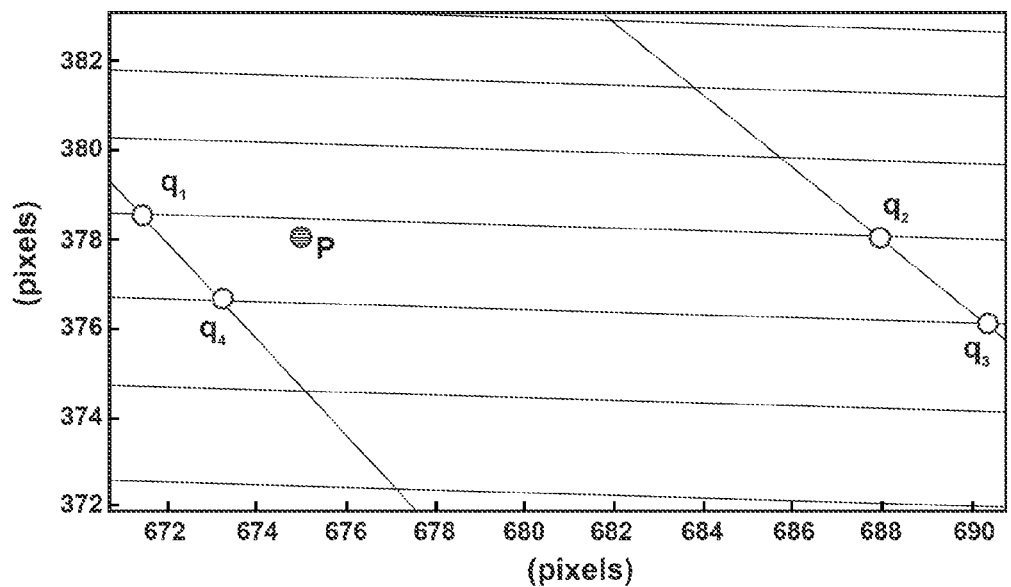
FIG. 7 is an enlarged graph portion from FIG. 6 showing a target point on screen coordinates.

After step 56, the processor 24 advances the program to step 60. At step 60 in FIG. 5, the processor 24 operates to find or determine a locus of four grid points in the screen coordinates that encircle the target point p and are closest thereto. This arrangement is shown in FIG. 7 wherein corner grid points $q_1$, $q_2$, $q_3$, $q_4$ surround the target point p. Thereafter, the processor 24 advances to step 62. At step 62, the processor 24 calculates the distance in screen coordinates from each of the four corner screen coordinate grid points $q_1$-$q_4$ to the target point p. The screen distances are stored in memory 26. Thereafter, the processor 24 advances to step 64.

At step 64, the processor 24 maps the four corner grid points $q_1$, $q_2$, $q_3$, $q_4$ onto world coordinates of a world coordinate grid and advances to step 66. The mapped coordinates are shown as four world corner grid points $Q_1$, $Q_2$, $Q_3$, $Q_4$ in FIG. 8.

Figure 8:
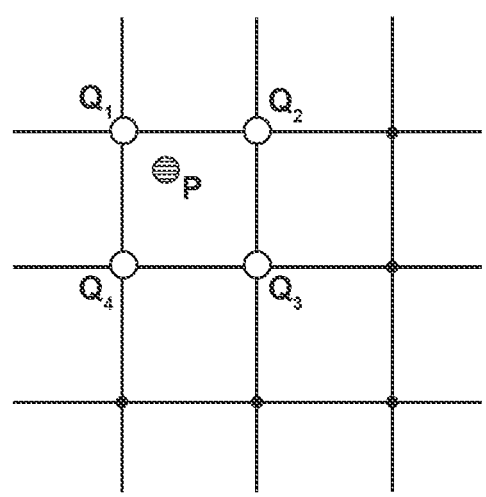
FIG. 8 is an enlarged graph portion showing corresponding world coordinates for the grid points of FIG. 5 and the target point in world coordinates.

At step 66 in FIG. 5, the processor 24 applies linear interpolation to determine the location of the target point p in the world coordinates as weighted by the screen distances. In one embodiment, the linear interpolation is applying bi-linear interpolation. More specifically, in one embodiment the corner grid points are each weighted by a square of an inverse of the respective screen distances determined for each of the four grid points of the screen coordinate grid. A sum of the inverse squared distances is normalized to determine the location of the target point p in world coordinates. Thus, the target point p is provided in world coordinates as shown in FIG. 8. As shown in FIG. 3, the world coordinates are a distance provided in centimeters for purposes of illustration. The processor 24 then advances to step 70.

The location of the video camera 30 on the vehicle 18 is known. In FIG. 3, the x direction and value is a distance away from the video camera 30 is provided in centimeters. A negative value of −100 centimeters is provided for an instance wherein the video camera 30 is provided outwardly from the vehicle in this embodiment. The video camera 30 is centered on the rear of the vehicle at value 00 in FIG. 3. Thus movement to the right or left in the y direction is provided in positive and negative centimeters. Other values can be assigned to the locations in the y direction so long as the processor 24 understands the locations for purposes of calculations. Values for z coordinates related to the height of the video camera 30 from the ground are also utilized. In some embodiments, the height of the video camera 30 corresponds to a given z world coordinate value of zero. Other arrangements are contemplated. The z direction is not labeled in FIG. 3, as the direction is perpendicular to both the x direction and the y direction.

At step 70, the distance and direction of the target point p from the video camera 30 is calculated using the x, y and z world coordinates. Triangular based equations or other programs executed by the processor 24 determine the distance and the angle/direction from the world coordinates of the video camera 30 and the target point p. Thereafter, the processor 24 advances to step 72.

At step 72, the distance and/or direction between the video camera 30 and the target point p are provided to another different ECU, or the ECU 22 utilizes the distance value and corresponding direction for collision avoidance while parking. Further, the changes in distance over time are determined to avoid a collision during parking and in other driving situations.

While the video camera 30 is shown mounted to a rear of the vehicle 18, in some embodiments the video camera or additional video cameras are mounted to the front and/or sides of the vehicle to provide assistance for frontward parking or angle parking.

In some embodiments, the speaker 34 provides warning messages based on the distance and direction of the video camera 30 from the target point p. While not discussed herein in detail, the system 20 is configured so that the vehicle operator is capable of selecting multiple target points p and each target point is followed so that the vehicle operator is aware of the locations of the multiple target points corresponding to multiple objects.

While not discussed in detail herein, in some embodiments, the system 20 utilizes image analysis to recognize the object at the selected target point p or at a region thereabout to determine motion of the object and thus of the target point p relative to the video camera 30 mounted on the vehicle 18.

Thus, the invention provides, among other things, a method and system for tracking objects to the rear of a vehicle 18 with a single video camera 30. Such an arrangement is less expensive than systems requiring a plurality of video cameras 30 and other sensors. Further, any object is detected due to the selection by the operator. Various features and advantages of the invention are set forth in the following claims.

What is claimed is:

1. A method of determining a distance and direction between a video camera provided on a vehicle and a target point as a point of interest of an object in a field of view of the video camera, comprising:
   pre-initializing by mapping and storing in an electronic control unit a grid of points representing a world coordinate grid mapped onto a screen coordinate grid;
   generating a video image with the video camera and providing the video image to an electronic control unit including a processor and a memory;
   displaying the video image on a display using the screen coordinate grid;
   obtaining the target point as the point of interest for the object in the video image;
   determining a locus of four grid points of the screen coordinate grid that encircle the target point;
   determining and storing screen distances from the target point to each of the four grid points encircling the target point;
   mapping the four grid points from the screen coordinate grid encircling the target point onto the world coordinate grid;
   applying interpolation to determine a location of the target point in the world coordinate grid as weighted by the screen distances; and
   using a known location of the video camera in world coordinates and the determined location of the target point in world coordinates, determining a distance between the location of the video camera and the target point of the object.

2. The method according to claim 1, wherein applying interpolation to determine the location of the target point comprises applying bi-linear interpolation.

3. The method according to claim 2, wherein the bi-linear interpolation for the location of the target point comprises:
   weighting each of the four grid points in the world coordinates encircling the target point by a square of an inverse of the screen distance determined for each of the four grid points in the screen coordinate grid; and
   normalizing by a sum of the inverse squared distances to determine the location of the target point in world coordinates.

4. The method according to claim 1, wherein the video camera comprises a monocular panoramic video camera.

5. The method according to claim 1, wherein the pre-initializing by mapping and storing the grid of points representing the world coordinate grid onto the screen coordinate grid, comprises:
   providing extrinsic video camera calibration parameters to the electronic control unit;
   providing the world coordinate grid of world coordinates with known physical dimensions;
   transforming the world coordinate grid to the screen coordinate grid in view of the calibration parameters; and
   providing the screen coordinate grid of the screen coordinates.

6. The method according to claim 5, wherein the extrinsic video camera calibration parameters include lens properties of a lens of the video camera.

7. The method according to claim 6, wherein the video camera comprises a monocular panoramic video camera.

8. The method according to claim 1, including determining changes in distance from the video camera provided on the vehicle to the target point of the object to avoid a collision.

9. The method according to claim 1, wherein the display comprises a touch screen and obtaining the target point as the point of interest for the object shown in the video image comprises touching the touch screen at the target point of the object in the video image di splayed thereon.

10. The method according to claim 9, wherein the obtaining of the target point as the point of interest for the object shown in the video image further comprises:

enlarging and centering the object shown in the video image at the touched target point on the touch screen;

selecting an exact target point of the object in the enlarged video image by touching the touch screen at the target point a second time; and defining the exact target point in response to the touching of the touch screen at the target point the second time.

11. A system for determining a distance and direction between a video camera provided on a vehicle and a target point as a point of interest of an object in a field of view of the video camera, comprising:

a video camera secured to a vehicle for generating video images; and an electronic control unit including a processor and a memory, the electronic control unit configured to:

pre-initialize by mapping and storing in memory a grid of points representing a world coordinate grid mapped onto a screen coordinate grid;

receive video images from the video camera;

display the video image on a display using the screen coordinate grid;

obtain the target point as the point of interest for the object shown in the video image on the display;

determine a locus of four grid points of the screen coordinate grid that encircle the target point;

determine and store screen distances from the target point to each of the four grid points;

map the four grid points encircling the target point from the screen coordinate grid onto the world coordinate grid;

apply interpolation to determine a location of the target point in the world coordinate grid as weighted by the screen distances; and using a known location of the video camera in world coordinates and the location of the target point in world coordinates, determine a distance and a direction from the location of the video camera to the target point of the object.

12. The system according to claim 11, wherein the interpolation to determine the location of the target point comprises bi-linear interpolation.

13. The system according to claim 12, wherein the bi-linear interpolation for the location of the target point further comprises:

weighting each of the four grid points in the world coordinates that encircle the target point by a square of an inverse of the screen distance determined for each of the four grid points of the screen coordinate grid; and normalizing by a sum of the inverse squared screen distances to determine the location of the target point in world coordinates.

14. The system according to claim 11, wherein the video camera comprises a monocular panoramic video camera.

15. The system according to claim 11, wherein the electronic control unit is configured to pre-initialize by mapping and storing in the memory the grid of points representing the world coordinate grid mapped onto the screen coordinate grid by:

obtaining extrinsic video camera calibration parameters for the video camera;

obtaining the world coordinate grid of world coordinates with known physical dimensions;

transforming the world coordinates to screen coordinates in view of the calibration parameters; and providing the screen coordinate grid with the transformed world coordinates.

16. The system according to claim 15, wherein the extrinsic video camera calibration parameters include lens properties of a lens of the video camera.

17. The system according to claim 16, wherein the video camera comprises a monocular panoramic video camera.

18. The system according to claim 11, wherein the electronic control unit is configured to determine changes in distance from the video camera provided on the vehicle to the target point of the object to avoid a collision.

19. The system according to claim 11, wherein the display comprises a touch screen and the electronic control unit is configured to receive signals from touch of the touch screen by an operator at the target point.

20. The system according to claim 19, wherein the electronic control unit is configured to:

enlarge and center the object shown in the video image on the touch screen at the touched target point; and receive signals from another touch of the enlarged video image on the touch screen by an operator to obtain an exact target point of the object in the enlarged video image; and define and store the exact target point on the enlarged video image.

21. A method of determining a distance and direction between a video camera provided on a vehicle and a target point as a point of interest of an object in a field of view of the video camera, comprising:

pre-initializing by mapping and storing in an electronic control unit a grid of points representing a world coordinate grid mapped onto a screen coordinate grid;

generating a video image with the video camera and providing the video image to an electronic control unit including a processor and a memory;

displaying the video image on a display using the screen coordinate grid;

obtaining the target point as the point of interest for the object in the video image;

determining a locus of grid points of the screen coordinate grid that encircle the target point;

determining and storing screen distances from the target point to each of the grid points encircling the target point;

mapping the grid points from the screen coordinate grid encircling the target point onto the world coordinate grid;

applying bi-linear interpolation to determine a location of the target point in the world coordinate grid as weighted by the screen distances; and using a known location of the video camera in world coordinates and the determined location of the target point in world coordinates, determining a distance between the location of the video camera and the target point of the object.

* * * * *